July 7, 1925. 1,545,347
M. D. MURRAY
AUTOCYCLE
Filed Sept. 30, 1920 7 Sheets-Sheet 3

July 7, 1925.   1,545,347
M. D. MURRAY
AUTOCYCLE
Filed Sept. 30, 1920   7 Sheets-Sheet 4

July 7, 1925.

M. D. MURRAY

AUTOCYCLE

Filed Sept. 30, 1920

Inventor
M. D. Murray,
By
Attorney

July 7, 1925.  
M. D. MURRAY  
AUTOCYCLE  
Filed Sept. 30, 1920  
1,545,347  
7 Sheets-Sheet 6
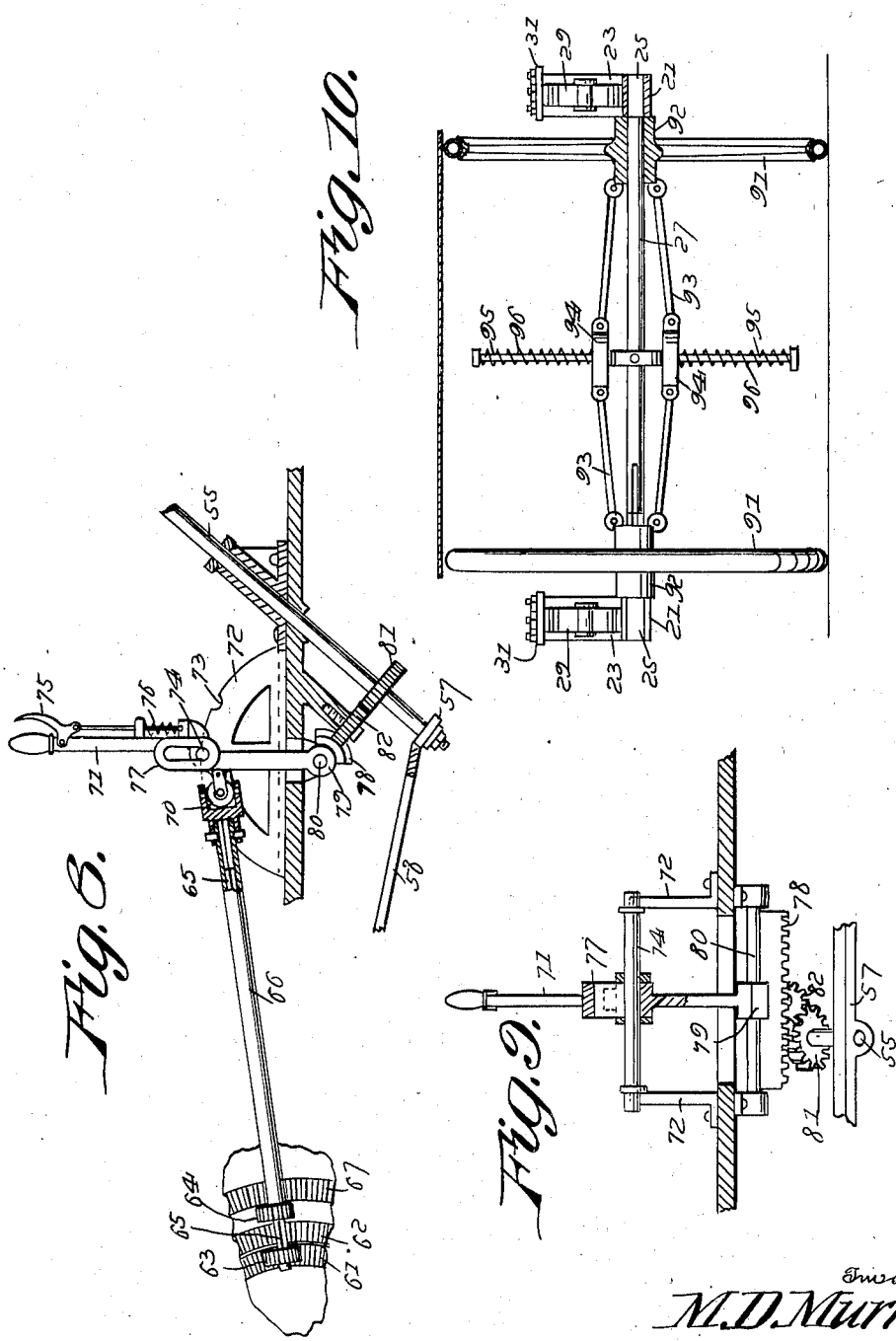

July 7, 1925.
M. D. MURRAY
1,545,347
AUTOCYCLE
Filed Sept. 30, 1920
7 Sheets-Sheet 7
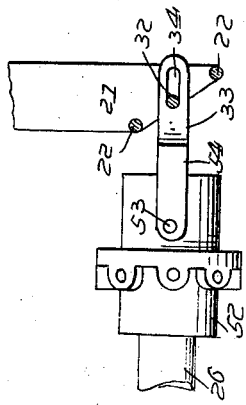
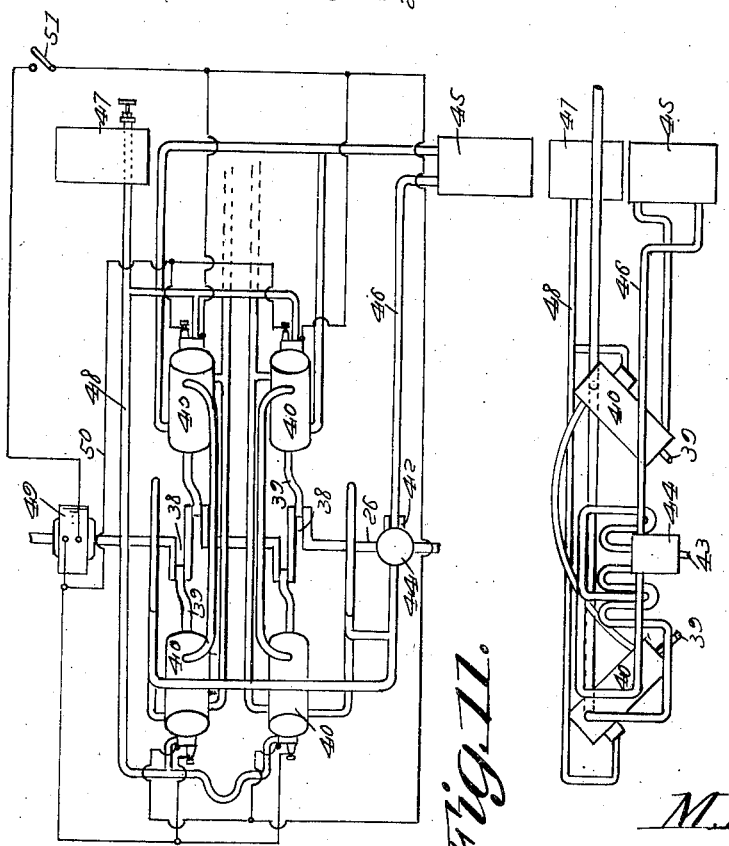
Inventor
M.D. Murray, Patented July 7, 1925.

1,545,347

UNITED STATES PATENT OFFICE.

MICHAEL D. MURRAY, OF AMBRIDGE, PENNSYLVANIA.

AUTOCYCLE.

Application filed September 30, 1920. Serial No. 413,715.

*To all whom it may concern:*

Be it known that I, MICHAEL D. MURRAY, a citizen of the United States of America, residing at Ambridge, in the county of Beaver and State of Pennsylvania, have invented new and useful Improvements in Autocycles, of which the following is a specification.

The object of the invention is to provide a motor vehicle in which the advantages in the matter of carrying capacity and the comfort of the passengers or occupants may be combined with those of facility in operation and control and by means of which a speed may be attained particularly in turning corners or following a devious path which is impossible with a vehicle of the four-wheeled type. A further object of the invention is to provide a car of relatively large capacity in the matter of the accommodation of passengers or occupants; which requires a comparatively small place for storage; which may be constructed and maintained at a minimum expense; which, while possessing the requisite strength, may be relatively light in weight; and which, therefore, is capable of traversing roads inaccessible to vehicles of the automobile type; and with this and further related objects in view the invention consists in the construction, combination and relation of parts, of which a preferred embodiment is shown in the accompanying drawings, wherein:—

Figure 6 is a side elevational view of the drive wheel.

Figure 7 is a sectional view of the transmission mechanism for effecting the operation of the drive wheel.

Figure 8 is an elevation of the control mechanism showing its connection with the transmission mechanism.

Figure 9 is a front elevation partly in section of the control mechanism.

Figure 10 is a transverse section of the rear end of the machine showing the rear wheels and the means whereby the position of the same with reference to the body of the car is controlled.

Figure 11 is a plan view of the circulating and ignition systems.

Figure 12 is a side view of the structure illustrated in Figure 11.

Figure 13 is a detail view of the front axle support and related parts.

Figure 5:
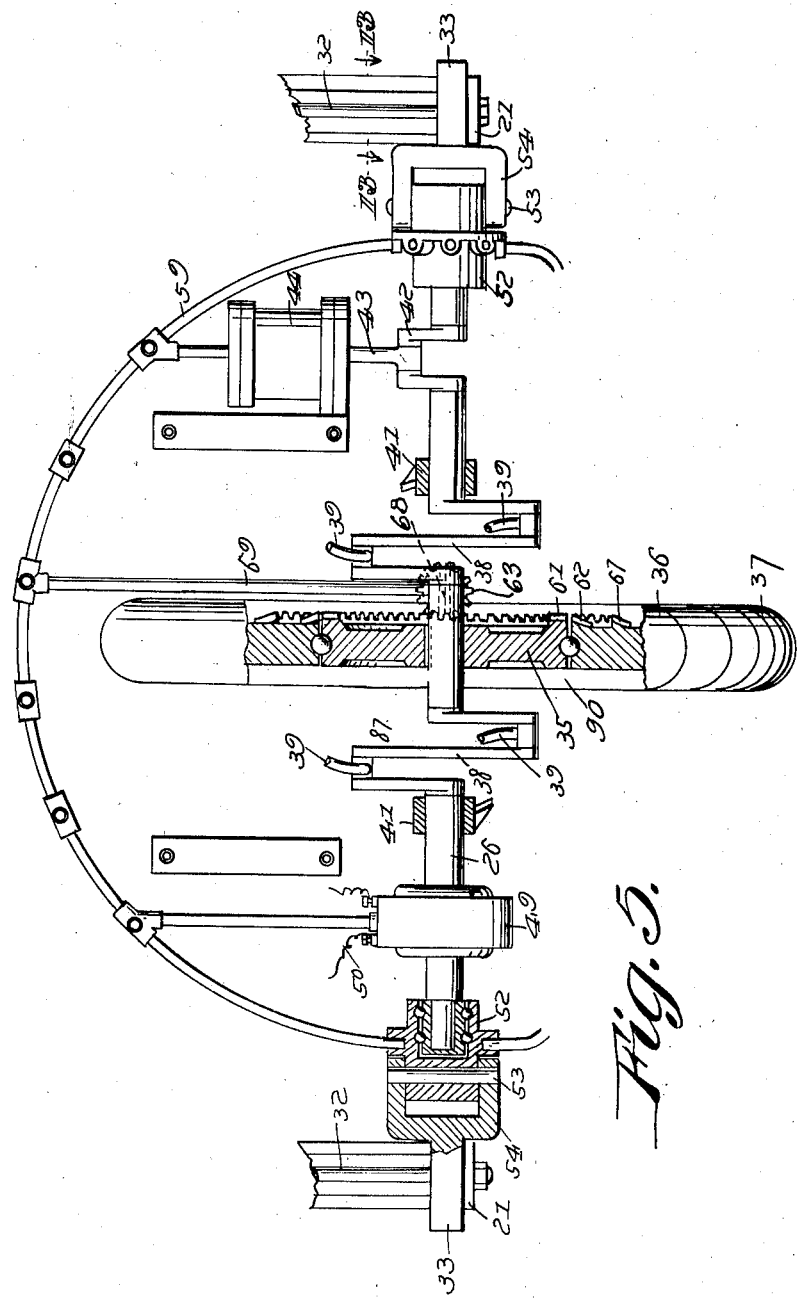
Figure 5 is a front elevation of the engine construction showing the same partly in section in the plane of the drive shaft or front axle.

The car body which is indicated at 20 is supported by a chassis of which the side bars 21 are provided at their front and rear ends with vertical guides 22 and 23 in which are mounted the vertically movable bearing boxes 24 and 25 for the extremities of the front and rear axles 26 and 27. The bearing boxes are yieldingly held in position by the front and rear elliptical springs 28 and 29, the upper ends of said guides being closed by plates 30 and 31 held in place by suitable nuts, as shown, or equivalent fastening means. Bolts 32 extend through the front guides and the forward elliptical springs and serve as fulcrums for the front axle supports 33 which are adapted for swinging movement in a horizontal plane and are slotted as shown at 34 to permit of a limited inward and outward movement of said supports incident to the angular movement of the drive shaft or front axle 26. Said drive shaft carries the driving disc 35 constituting a fly wheel suitably keyed to the center of the shaft, and having ball bearing mountings as shown in Figure 5 in the annular drive wheel 36 which may be fitted with a cushion or pneumatic tire as in the ordinary practice, while at the side of the driving disc, the shaft 26 is provided with double cranks 38 with which are respectively engaged the piston rods 39 of the engine cylinders 40. Also carried by said drive shaft adjacent to the double cranks are the fans 41 while connected to a supplemental crank 42 is the piston rod 43 of a circulating pump 44 in communication with the water tank 45 by pipe 46.

Carried by the forward end of the machine preferably opposite to the water tank 45 is the gasoline tank 47 from which extends the fuel circulating tube 48 reaching to the several engine cylinders as will be seen by reference to Figures 11 and 12. The generator 49 is also fitted to the drive shaft preferably at the opposite side of the drive wheel from the circulating pump and is connected by the suitable conductors 50 with the several spark plugs of the engine cylinders including a suitable switch indicated at 51.

In the illustrated embodiment of the invention, the extremities of the drive shaft are fitted in bearing sleeves 52, suitable anti-friction bearing elements being employed in that connection, and said bearing sleeves are mounted by means of vertical pivots 53 in the yokes 54 forming the inner ends of the supports 33 to the end that the drive shaft may be deflected from a transverse position in the horizontal plane to effect a corresponding lateral deflection of the driving wheel to vary the direction of progress of the car by means of a suitable steering mechanism, and such movement of the shaft will be compensated for by swinging transverse movement of the supports 33 which adapt themselves to the adjusted positions of the shaft. In the construction illustrated, the steering movement of the drive shaft is effected from a steering post 55 having the usual steering wheel 56 and the head 57 connected by links 58 to the bearing sleeves 52.

Figure 1:
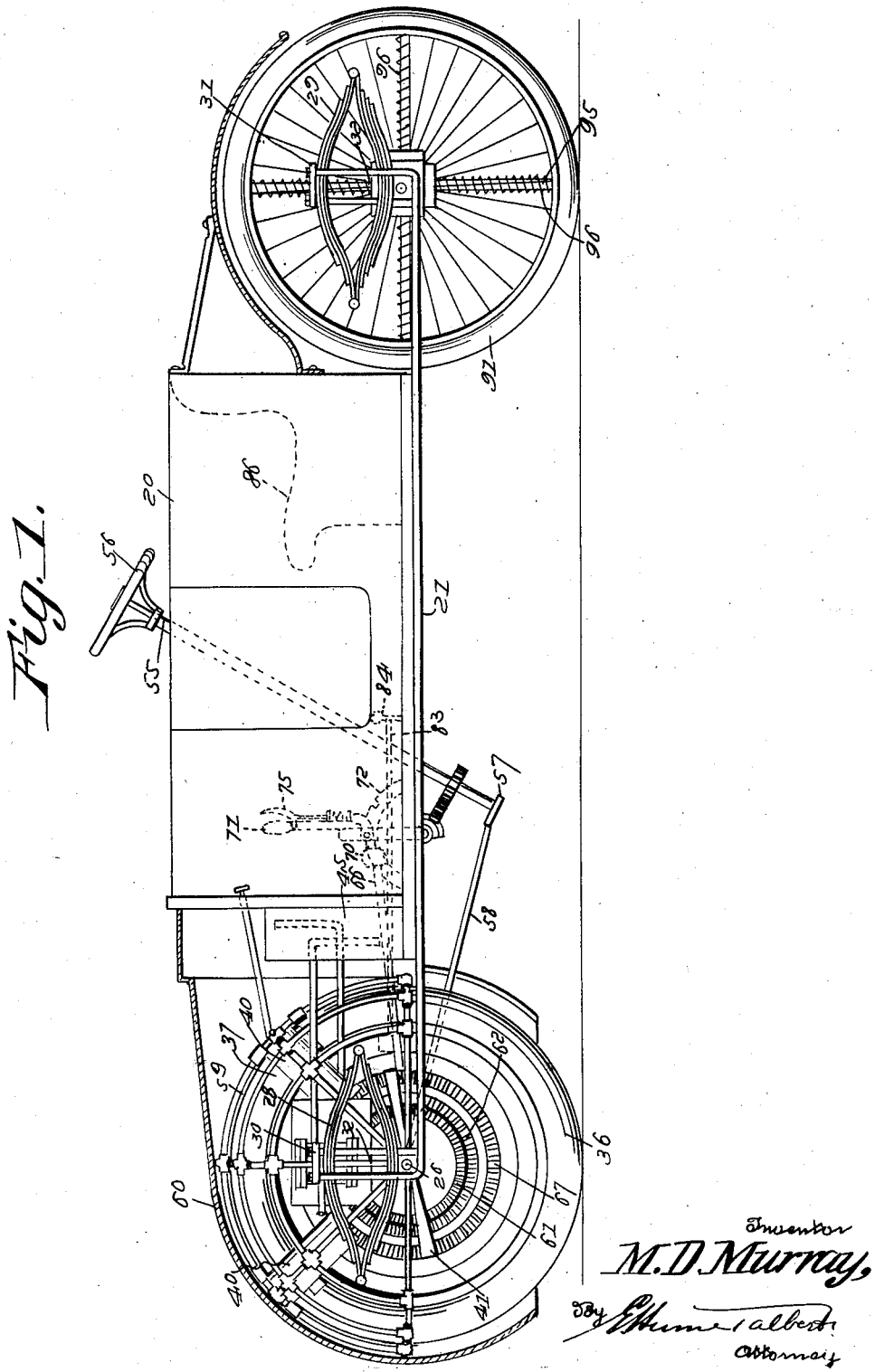
Figure 1 is a side view of a vehicle embodying the invention.
Figure 2:
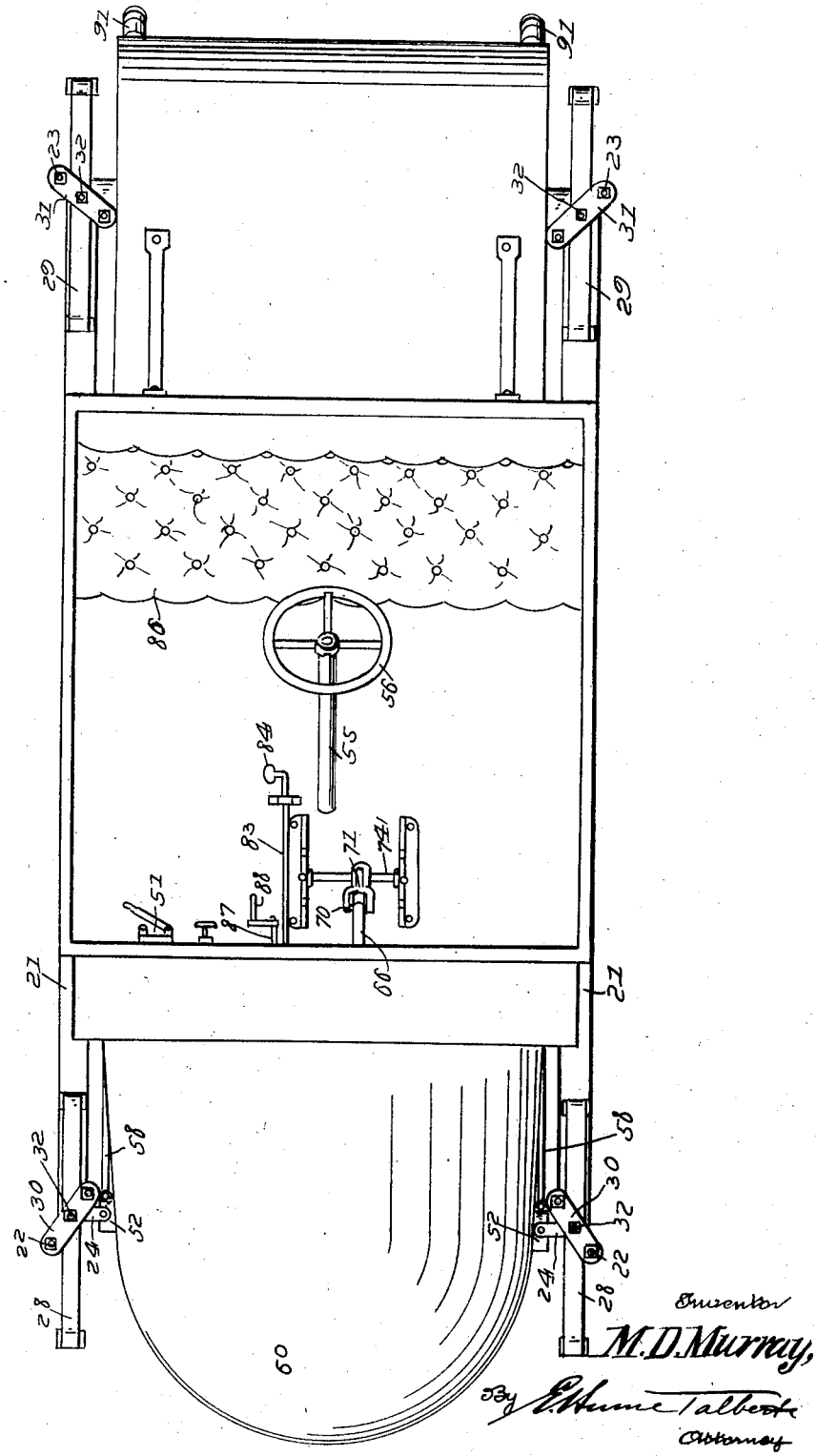
Figure 2 is a plan view of the same.
Figure 3:
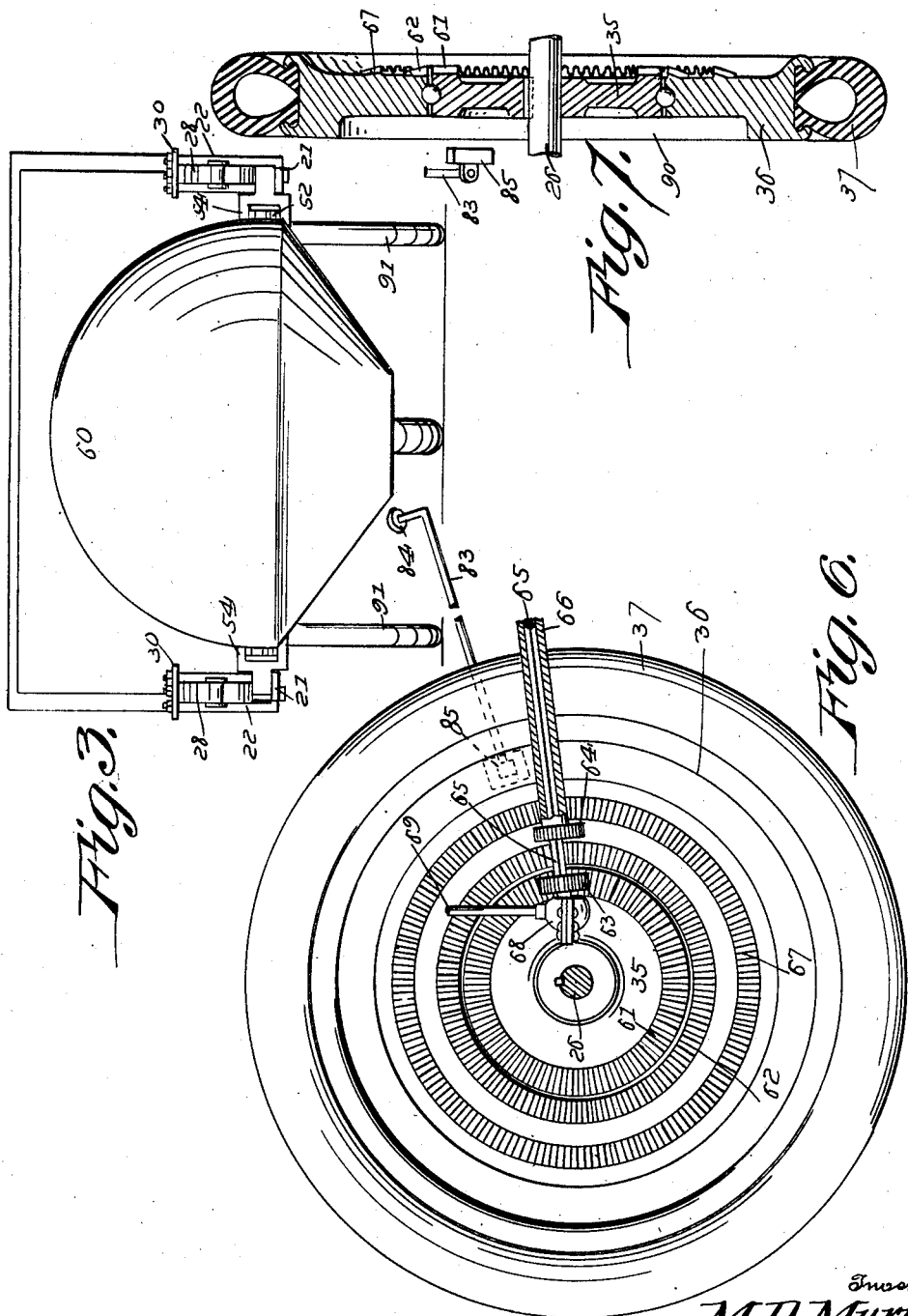
Figure 3 is a front view.
Figure 4:
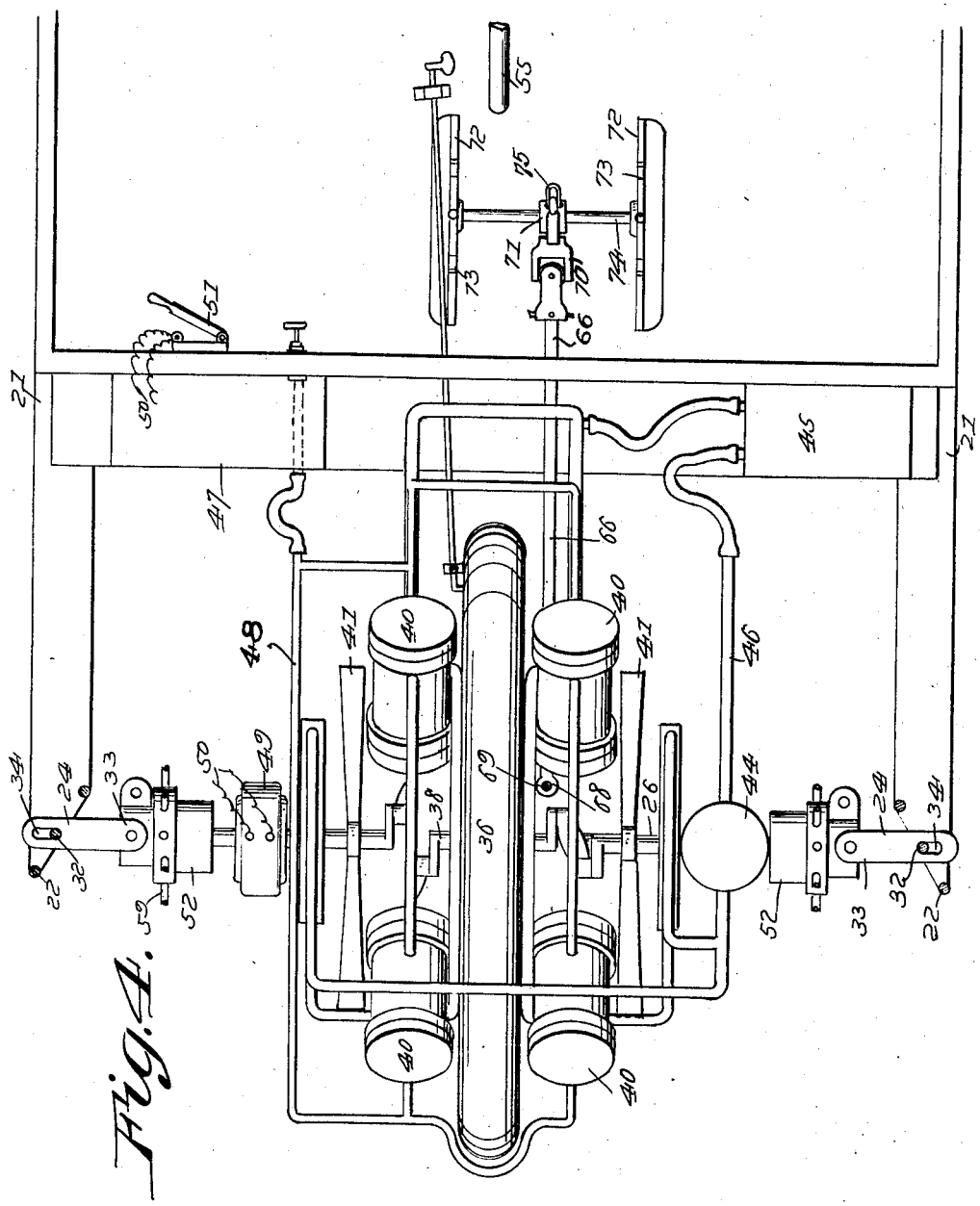
Figure 4 is an enlarged detail plan view of the engine and related parts.

Said bearing sleeves also serve as a means for supporting a spider frame 59 of approximately semi-spherical form which constitutes the support for the engine cylinders and pump and related parts of the mechanism and is in turn covered for the protection of the operating mechanism by means of a semi-spherical hood 60, as shown particularly in Figure 3.

The transmission mechanism illustrated embodies concentric gears 35 and 36 provided on certain of their faces with gear teeth 61, 62 and 67 for engagement with gears 63 and 64 carried respectively by a spindle 65 and a sleeve 66 which are keyed together for simultaneous rotary movement, the sleeve being adapted for longitudinal movement independently of the spindle to effect disengagement of the gear 64 from the gear teeth 62 so that it may occupy a neutral position as indicated in Figure 6 when the transmission of motion from the gear 35 to the gear 36 is not desired. The gear teeth 62 and 67 make it possible for a change in the ratio of the transmission of motion from the gear 35 to the gear or wheel 36 through the medium of shifting the gear 64 in engagement with the teeth 62 or 67.

Merely for illustrative purposes, the gear teeth 61, 62 and 67 are radially straight, not shown as beveled, and there is substantial play between the teeth of the gears 63 and 64 and the teeth 61, 62 and 67 in order to permit the gear 64 to be shifted into engagement with the teeth 62 or the teeth 67 and yet permit of a transmission of motion. However, in actual practice, these gears may be properly beveled and yet permit the gear 64 to be shifted. By making substantial looseness of play between the gear 64 and the teeth 62 and 67 permits the gear 64 to be shifted without causing any abutment of the gear 64 with the teeth 62 and 67 during the act of shifting. The forward end of the spindle 65 is mounted in a universally supported bearing 68 carried by a hanger 69 depending from the spider frame and the rear end of the shifting sleeve 66 is connected by a swivelly mounted universal joint 70 with the controlling lever 71 which is mounted for forward and rearward swinging movement with relation to a segment 72 having a plurality of seats or notches 73 for engagement by a locking rod or dog 74 actuable by a latch lever 75 and yieldingly held in its engaging position by a spring 76.

Obviously the movement of the controlling lever will effect the shifting of the transmission gear 64 to cause engagement with the desired gear member of the driving wheel to transmit motion thereto from the drive disc, to propel the machine at the desired speed.

The controlling lever is provided with a hood 77 which is slidably mounted upon a rod 74 to provide for the lateral swinging movement of the telescoping shaft (consisting of the spindle 65 and sleeve 66) to correspond with the swinging movement of the drive wheel incident to the steering of the car, and the movement of said parts in synchronism with the movement of the steering wheel is effected by means of a rack 78 which is of cross sectionally segmental form, as shown in Figure 8, and which is carried by a sleeve 79 attached to the lower end of the controlling lever and mounted upon the fulcrumed pin 80 of said lever together with intermeshing gears 81 and 82 of which the former is carried by the steering post 65 and the latter is in mesh with the rack bar 78. It will be obvious that as the steering post is turned to vary the angular position of the drive wheel which also constitutes the steering wheel of the car, the rack 78 is moved to correspondingly shift the controlling lever laterally to thereby carry the rear end of the telescoping shaft to maintain an engaging relation of the gears 63 and 64 with the elements of the driving disc and wheel.

Whereas it is desirable that the car may be substantially supported in an upright position when it is at rest or moving slowly and at the same time may have a wheel base of limited width similar to that of a motorcycle when in rapid movement, the rear wheels 91 are provided with hubs 92 carried by and keyed to the rear axle 27 and connected by links 93 with centrifugal weights 94 which are mounted for movement upon radial arms 95 also carried by the rear axle and fitted with compression springs 96 which tend to hold the weights close to the axle to which they are attached to be compressed by the centrifugal action of said weights to draw the rear wheels toward each other and hence toward the transverse center of the vehicle as the speed of movement increases. Thus when the vehicle is travelling at a relatively high rate of speed, the rear wheels are arranged close to the longitudinal axis of the vehicle constituting in effect a single wheel which is substantially in alignment with the front or driving wheel to produce the same effect in the operation of the machine as is secured in a motorcycle. Obviously the range of movement of the rear or supporting wheels may be varied to suit the character or purpose of the car or conditions under which it is to be operated to the end that the desired transverse stability may be afforded when the same is at rest or moving slowly without interfering with the freedom of the steering movement of the vehicle when travelling at a high rate of speed.

The invention having been described, what is claimed as new and useful is:—

1. An autocycle having a front drive wheel comprising an inner motor-actuated disc carrying an independently movable tread member, said wheel and tread member being respectively provided with concentric gear members, and a transmission mechanism having a telescoping shaft of which the members are keyed for simultaneous rotary movement and respectively carry gears for engagement with the gear members of said driving wheel and said tread member.

2. An autocycle car comprising a body, a front wheel and a pair of rear wheels therefor, a front driven axle, a rear axle, a fly wheel carried by said front axle and having said front wheel revolubly mounted upon itself and in the plane thereof, means for driving said front axle, means for transmitting motion from said fly wheel to said front wheel for driving the latter, and a steering mechanism for said front wheel.

3. An autocycle car comprising a body, a front axle, a toothed fly wheel fixed thereto, means for driving said axle, a front driven wheel revolubly mounted upon said fly wheel in the plane thereof and provided with concentric rows of teeth, and means operatively engaging with the teeth of the fly wheel and with one of the rows of teeth of the front wheel for driving the latter.

4. An auto cycle car comprising a body, a front axle, a toothed fly wheel fixed thereto, means for driving said axle, a driven front wheel revolubly mounted upon said fly wheel in the plane thereof and provided with concentric rows of teeth, means operatively engaging with one of the rows of teeth of the front wheel for driving the latter, and means for shifting said last named means clear of the teeth of the front wheel and for further shifting said teeth engaging means whereby it may be engaged with the other row of teeth carried by the front wheel.

5. An auto cycle car comprising a body, a front axle, a toothed fly wheel fixed thereto, means for driving said axle, a driven front wheel revolubly mounted upon said fly wheel in the plane thereof and provided with concentric rows of teeth, means operatively engaging with one of the rows of teeth of the front wheel for driving the latter, means for shifting said last named means clear of the teeth of the front wheel and for further shifting said teeth engaging means whereby it may be engaged with the other row of teeth carried by the front wheel, and a steering mechanism connected with the front axle.

6. An auto cycle car comprising a body, a driven front axle and a rear axle, wheels carried by the rear axle, a fly wheel carried by the front axle, means for driving said front axle, a driven front wheel revolubly mounted upon said fly wheel in the plane thereof, and a speed changing transmission between said fly wheel and said front wheel.

7. An auto cycle car comprising a body, a driven front axle and a rear axle, wheels carried by the rear axle, a fly wheel carried by the front axle, means for driving said front axle, a driven front wheel revolubly mounted upon said fly wheel in the plane thereof, a speed changing transmission between said fly wheel and said front wheel, means for operating said speed changing transmission, and a steering mechanism for said front wheel.

In testimony whereof he affixes his signature.

MICHAEL D. MURRAY.